US012800363B2

(12) United States Patent
Billet et al.

(10) Patent No.: US 12,800,363 B2
(45) Date of Patent: Nov. 17, 2026

(54) OPTIMISED METHOD FOR COLLECTING DATA FROM COMMUNICATING METERS VIA A CELLULAR NETWORK AND SYSTEM FOR IMPLEMENTING THE METHOD

(71) Applicant: SAGEMCOM ENERGY & TELECOM SAS, Bois-Colombes (FR)

(72) Inventors: Claire Billet, Bois-Colombes (FR); Rahid Djafri, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/957,355

(22) Filed: Nov. 22, 2024

(65) Prior Publication Data

US 2025/0198814 A1 Jun. 19, 2025

(51) Int. Cl.
*G06F 11/30* (2006.01)
*G01D 21/02* (2006.01)

(52) U.S. Cl.
CPC .................................... *G01D 21/02* (2013.01)

(58) Field of Classification Search
CPC ........ G01D 21/02; G01D 4/004; G01D 4/002; G05B 13/0265; G05B 19/4183; G05B 2219/31211; G07C 5/008; G08C 17/02; G16Y 20/00; H04L 67/12; H04L 45/02; H04L 43/06; H04L 43/106; H04L 47/805; H04L 41/069; H04L 43/04; H04L 43/08;
(Continued)

(56) References Cited

U.S. PATENT DOCUMENTS 8,767,744 B2 * 7/2014 Osterloh ................. H04L 67/62 370/236
9,961,580 B2 * 5/2018 Strobl ................... H04W 24/10
(Continued)

FOREIGN PATENT DOCUMENTS

EP 2582181 B1 6/2014
FR 3073652 A 5/2019

OTHER PUBLICATIONS

T. Khalifa, K. Naik and A. Nayak, "A Survey of Communication Protocols for Automatic Meter Reading Applications," in IEEE Communications Surveys & Tutorials, vol. 13, No. 2, pp. 168-182, Second Quarter 2011, doi: 10.1109/SURV.2011.041110.00058. (Year: 2011).*

(Continued)

*Primary Examiner* — Phuong Huynh
(74) *Attorney, Agent, or Firm* — Williams Mullen; R. Brian Drozd

(57) ABSTRACT

A method for collecting, via a communication network of the cellular type, data available in a set of communicating meters, the method being implemented in a data collection system connected to said network and the method including: obtaining first information representing the behaviour of said meters; establishing parameters representing the behaviour of each of the communicating meters from said first information; establishing a scheduling for collecting data from all or some of said meters from said parameters representing the behaviour of each of the meters, and transmitting data collection messages to said meters for which said scheduling was established. The invention also relates to a data collection system configured to implement the method.

19 Claims, 3 Drawing Sheets

(58) Field of Classification Search
CPC ......... H04M 2207/18; H04M 3/42178; H04M 3/4228; H04W 84/18; H04W 4/38; H04W 8/005; H04W 24/08; H04W 24/02; H04W 4/70; H04W 88/08; H04W 48/20; H04W 52/02; H04W 56/0015; H04W 72/0446; H04W 16/24; H04W 24/00; H04W 24/04; H04W 28/0226; H04W 4/00; H04W 4/021; H04W 4/023; H04W 8/24; H04W 84/042; H04W 88/02; Y02B 90/20; Y02D 30/00; Y04S 20/30
See application file for complete search history.

(56) References Cited

U.S. PATENT DOCUMENTS

| | | | | |
|---|---|---|---|---|
| 11,228,982 | B2 * | 1/2022 | Gubeskys | H04B 1/3838 |
| 2006/0224335 | A1 * | 10/2006 | Borleske | G01D 4/002<br>702/62 |
| 2015/0264657 | A1 * | 9/2015 | Abraham | H04W 52/0216<br>370/328 |
| 2015/0308856 | A1 * | 10/2015 | Srinivasan | H04L 67/12<br>340/870.02 |
| 2016/0011006 | A1 * | 1/2016 | Wang | G01D 18/00<br>340/870.02 |
| 2019/0075597 | A1 * | 3/2019 | Yerramalli | H04L 5/0091 |
| 2019/0098377 | A1 | 3/2019 | Kallus et al. | |
| 2019/0357015 | A1 * | 11/2019 | Wheeler | G06V 20/64 |
| 2023/0328792 | A1 * | 10/2023 | Ma | H04W 24/10<br>370/329 |

OTHER PUBLICATIONS

Jun. 20, 2024 Preliminary Search Report and Written Opinion issued in French Patent Application No. FR2308748.

* cited by examiner

OPTIMISED METHOD FOR COLLECTING DATA FROM COMMUNICATING METERS VIA A CELLULAR NETWORK AND SYSTEM FOR IMPLEMENTING THE METHOD

TECHNICAL FIELD

The present invention relates to a method for collecting data available in communicating meters, implemented by a data collection system and operated via a communication network of the cellular network type. At least one embodiment of the invention relates to a method for collecting data coming from electricity, water or gas meters configured to communicate with a data concentrator via an IP network of a mobile telephony operator.

PRIOR ART

Recent electricity consumption meters are so-called "smart" and/or "communicating" electronic devices able to generate and transmit data to a remote server or system implementing data collection functions, for example a consumption-management server, through varied communication networks, in particular for pricing and information-collecting services in relation to electricity, water or gas consumption. Some of these meters are configured to transmit the data that they have generated via a communication network of the cellular type, such as for example a network of a mobile telephony operator. Such a network consists of a set of communication cells in which each cell is covered by a transmission and reception station referred to as a base station. In other words, the territory covered by the cellular communication network is divided into cells each comprising a base station. Each of the cells comprises one or more communicating meters generating information useful to the management of one or more supplies of service or products. It is then necessary to implement a collection of data from these meters while taking account of the communication capability of each of the cells in the communication network. The current techniques for collecting information from meters are liable to cause effects of congestion on the cellular communication network, all the more so since communicating meters are sometimes equipment put on standby between two operations of processing or collecting information, which means that it is first necessary to control the meter to wake it up, and then next to collect the useful information. Other times the meters are temporarily rendered out of range of the network because of interference. When a collection of information targeting a meter fails, this must be reiterated until the information is collected, which involves a redundant use of the network resources for the same information. There is therefore a need to optimise the collection methods for obtaining numerous data from a set of meters, in accordance with timetable constraints imposed, while limiting the use of network resources that are furthermore used for other uses. The situation can be improved.

DISCLOSURE OF THE INVENTION

The aim of the invention is to propose a method for collecting data from communicating meters, in accordance with timetable constraints, while limiting the use of network resources.

For this purpose, a method is proposed for collecting, via a communication network of the cellular type, data available in a set of communicating meters, the method being implemented in a data collection system connected to said network, and the method comprising:

i) obtaining first information representing the behaviour of said meters, ii) establishing parameters representing the behaviour of each of the communicating meters from said first information, iii) establishing a scheduling of collection of data from all or some of said meters from said parameters representing the behaviour of each of the meters, and iv) transmitting data collection messages to said meters in accordance with said scheduling established.

Advantageously, it is thus possible, thanks to a learning of the behaviour typical of each of the communicating meters, to make provision for making a collection of data from a meter only when the latter has the greatest probability of responding (and therefore of responding on the first try). The cellular communication network is then shared reasonably between the collection system and the other applications that use the network. Furthermore, such a method advantageously makes it possible to detect seasonality phenomena in the behaviour of the communicating meters connected to the cellular communication network and take account thereof for the data collections to be made.

The method according to the invention can also comprise the following features, considered alone or in combination:

Said first information comprises at least:

- an identifier of a cell of said network with reference to a communicating-meter identifier,
- a state of obtaining a response from a meter to a message that is sent to it with reference to a timestamping,
- a response time of a meter to a message that is sent to it, where applicable, with reference to a timestamping.

Thus, it is possible to determine behaviour parameters of each of the meters, which are for example a mean response time and a mean response rate for each meter, according to the date and time, and with reference to a cell via which it is accessible.

Establishing a data-collection scheduling from the parameters established is implemented with reference, for each of the communicating meters, to an identifier of a cell from which a communicating meter is accessible.

Establishing the parameters representing the behaviour of each of the meters comprises a statistical analysis.

The statistical analysis is implemented with reference to a maximum collection time.

The statistical analysis is implemented with reference to a minimum use of the communication network.

Establishing the parameters representing the behaviour of each of the meters comprises a learning by means of a module of the classifier type.

The learning by means of a module of the classifier type is implemented with reference to a maximum collection time.

The learning by means of a module of the classifier type is implemented with reference to a minimum use of the communication network.

Another object of the invention is a system (or device) for collecting, via a communication network of the cellular type, data available in a set of communicating meters, the collection system comprising electronic circuitry configured for:

i) obtaining first information representing the behaviour of said meters, ii) establishing parameters representing the behaviour of each of the communicating meters from said first information, iii) establishing a scheduling of collection of data from all or some of said meters from said parameters representing the behaviour of each of the meters, and iv) transmitting data collection messages to said meters in accordance with said scheduling established.

The collection system according to the invention can also comprise the following features, considered in isolation or in combinations:

The data collection system furthermore comprises circuitry configured to process said first information comprising:

an identifier of a cell of said network with reference to a communicating-meter identifier, a state of obtaining a response from a meter to a message that is sent to it with reference to a timestamping, a response time of a meter to a message that is sent to it, where applicable, with reference to a timestamping.

The data collection system comprises electronic circuitry configured to establish a data-collection scheduling from the parameters established with reference, for each of the communicating meters, to a cell identifier from which a communicating meter is accessible.

The data collection system furthermore comprises electronic circuitry configured to establish the parameters representing the behaviour of each of the meters by making a statistical analysis.

The data collection system furthermore comprises electronic circuitry configured to make the statistical analysis with reference to a maximum collection time.

The data collection system furthermore comprises electronic circuitry configured to make the statistical analysis with reference to a minimum use of the communication network.

The data collection system furthermore comprises electronic circuitry configured to establish the parameters representing the behaviour of each of the meters by a learning by means of a module of the classifier type.

The data collection system furthermore comprises electronic circuitry configured to implement the learning by means of a module of the classifier type, with reference to a maximum collection time.

Another object of the invention is a computer program product comprising program code instructions for performing the steps of a method as previously described, when this program is executed by a processor of a data collection system.

Finally, another object of the invention is an information storage carrier comprising a computer program product as cited above.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
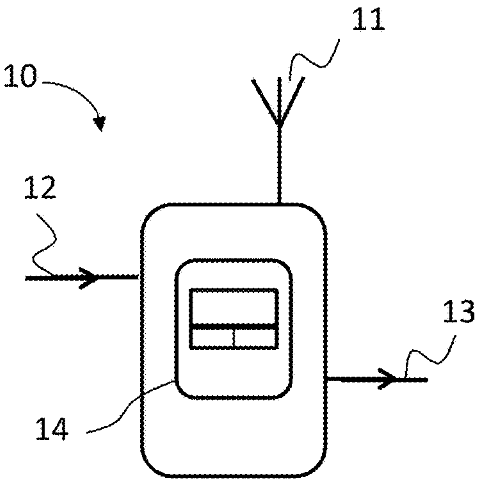
FIG. 1 illustrates schematically a communicating meter generating data to be collected, as already known.

FIG. 1 illustrates schematically a communicating meter 10, already known in the prior art and configured to collect information on supply of a physical quantity such as water, electricity or gas for example. Such a communicating meter is also sometimes called a smart meter. The communicating meter 10 is arranged to implement a metering of a physical quantity distributed and passing between an inlet 12 of the communicating meter 10 connected to a network supplying the physical quantity, and an outlet 13 of the communicating meter 10 connected to a domestic, industrial or commercial installation for example, consuming the physical quantity distributed, the consumption of which must be measured and/or monitored remotely. The communicating meter 10 comprises a man-machine interface 14, also called a user interface, suitable for entering and displaying information related to the use of the meter. The communicating meter 10 furthermore comprises internal electronic circuitry comprising in particular one or more microcontrollers and a radio communication interface (not shown on the figure) connected to an antenna system 11. Thus the communicating meter 10 is configured to communicate in a communication network of the cellular type.

Figure 2:
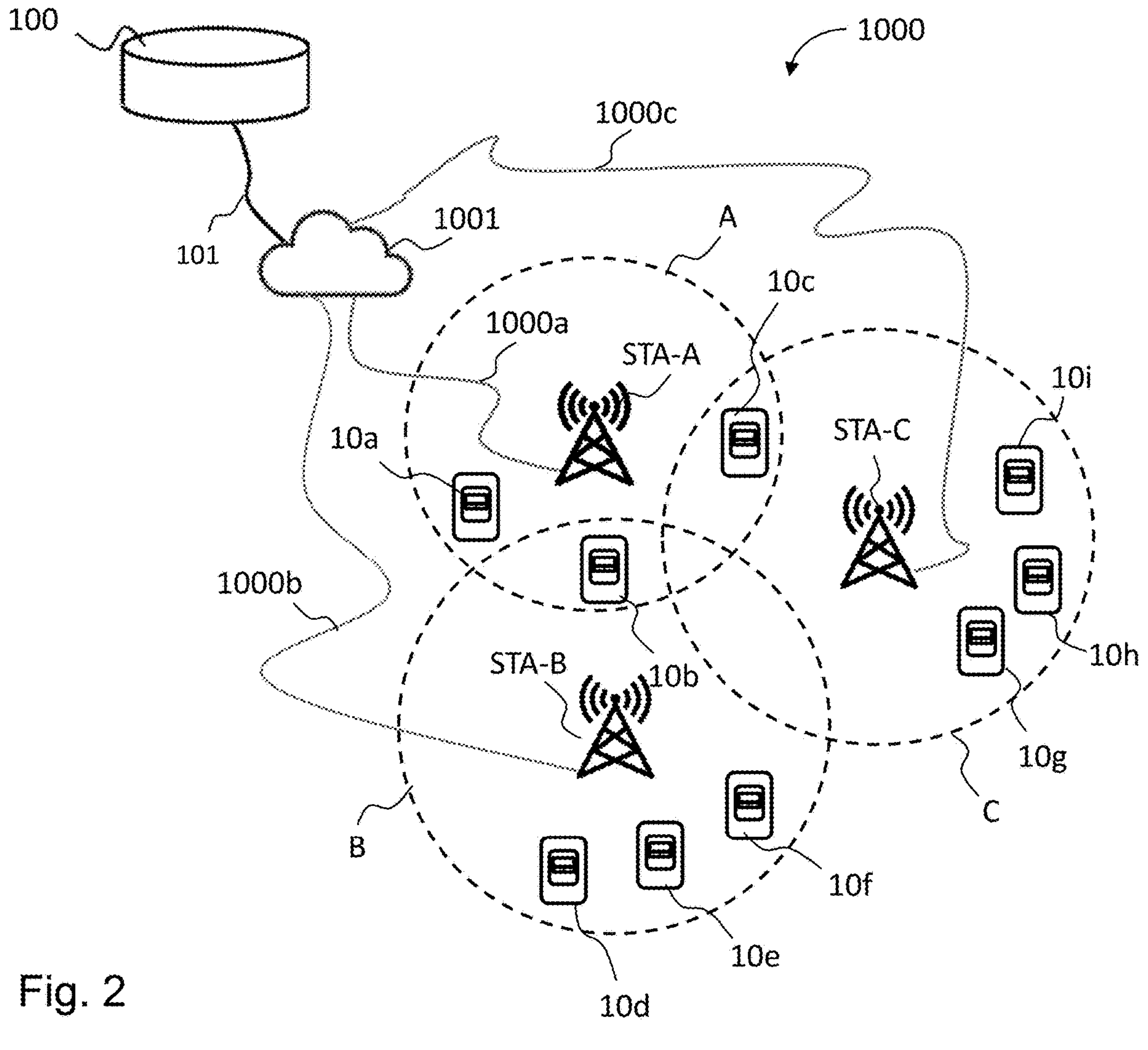
FIG. 2 is a schematic representation of a communication network of the cellular type to which communicating meters are connected and comprising an improved system for collecting data generated by the meters, in accordance with one embodiment.

FIG. 2 illustrates schematically and globally a communication network 1000 of the cellular type, comprising a communication subnetwork 1001 to which three base stations STA-A, STA-B and STA-C are connected, configured to send and receive signals from and to third-party devices compatible with the communication network and connected thereto. According to the example described, the base station STA-A is connected to the communication subnetwork 1001 via a cable communication link 1000*a*, the base station STA-B is connected to the communication subnetwork 1001 via a cable communication link 1000*b* and the base station STA-C is connected to the communication subnetwork 1001 via a cable communication link 1000*c*. Obviously, each of the base stations STA-A, STA-B or STA-C could be connected to the communication subnetwork 1001 via a wireless link. Each of the base stations STA-A, STA-B and STA-C covers a geographical zone called a cell. According to the example described, the base station STA-A covers a cell A, the base station STA-B covers a cell B and the base station STA-C covers a cell C. Communicating meters 10*a*, 10*b*, 10*c*, 10*d*, 10*e*, 10*f*, 10*g*, 10*h* and 10*i*, similar to the communicating meter 10 previously described in relation to FIG. 1, are installed in the coverage zone of the communication network 1000, established thanks to the combination of the base stations STA-A, STA-B and STA-C implementing respectively radio transmissions in the cells A, B and C. In the example described, the number of cells in the communication network 1000 and the number of communicating meters are intentionally reduced to facilitate reading of the present description and understanding thereof. Obviously, in reality, the number of cells may be in tens, hundreds or thousands for a data collection system and the same applies to the number of meters to which a data collection relates. Although a communicating meter can be positioned geographically in a plurality of cells in the communication network 1000, it is considered here that such a communicating meter, connected to a fixed installation, is fixed and that it is consequently connected to a single cell in the communication network 1000 at a given instant. According to one embodiment, a communicating meter located in a plurality of cells is connected to the communication network 1000 via the cell the base station of which offers it the best communication performances. Thus, according to the example embodiment described on FIG. 2, the communicating meters 10*a*, 10*b* and 10*c* are connected to the communication network 1000 via the base station STA-A operating in the cell A, the communicating meters 10*d*, 10*e* and 10*f* are connected to the communication network 1000 via the base station STA-Be operating in the cell B and the communicating meters 10*g*, 10*h* and 10*i* are connected to the communication network 1000 via the base station STA-C operating in the cell C. The communication network 1000 furthermore comprises a data collection system 100 configured to collect data generated by the communicating meters 10*a*, 10*b*, 10*c*, 10*d*, 10*e*, 10*f*, 10*g*, 10*h* and 10*i*. According to the example described, the data collection system 100 is connected to the communication subnetwork 1001 via a cable communication link 101. According to a variant, the data collection system 100 is connected to the communication subnetwork 1001 via a wireless link. The data collection system 100 is also here called a data collection device or management server of a service provider. Advantageously, the data collection system 100 is configured to implement a data collection method aimed at optimising the collection of data by reducing the use of the resources of the communication network 1000, said network, of the cellular type, being intended to be shared with other uses or applications, including in particular normal mobile-telephony or telecommunications applications on a mobile telephony network (audio and/or video transport for example). Thus the data collection system 100 is configured to implement an improved collection method described in relation to FIG. 3.

Figure 3:
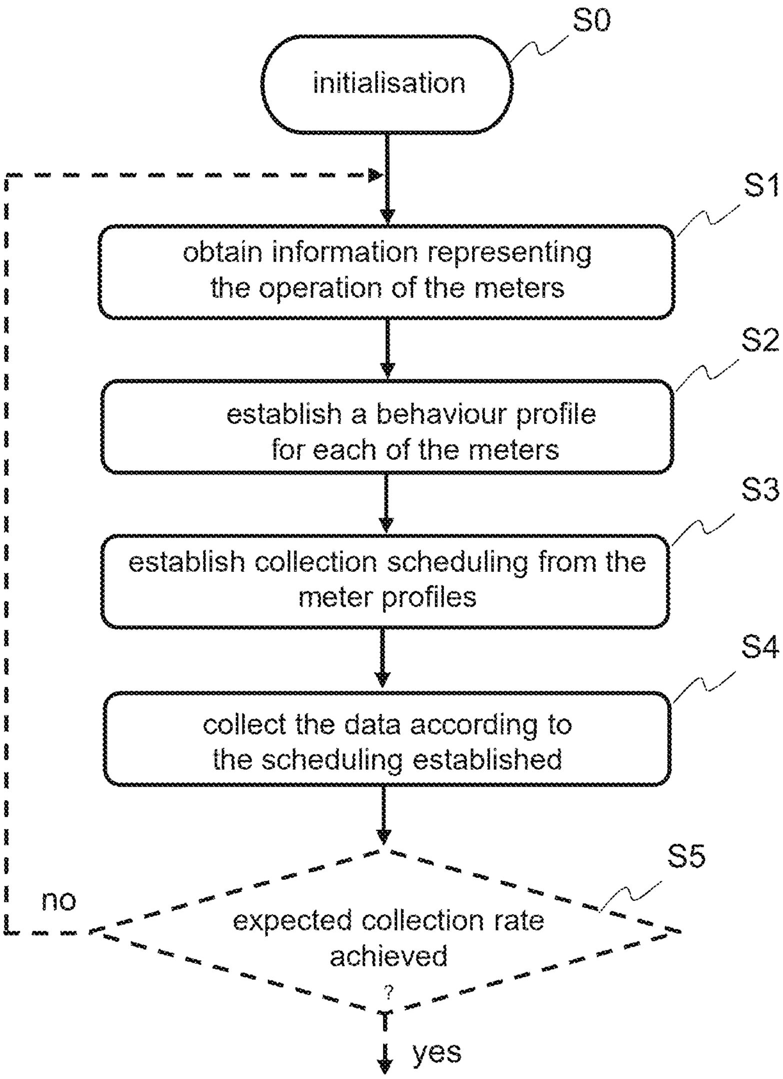
FIG. 3 is a flow diagram illustrating an improved data collection method implemented in the communication network already shown on FIG. 2, according to one embodiment.

FIG. 3 illustrates steps of the improved data collection method implemented in the communication network 1000 or in a similar communication network.

A step S0 corresponds to an initialisation step at the end of which the data collection system 100 and all the systems of the communication network 1000 are normally configured to make data transmissions through the communication network 1000. Thus, at the end of the step S0, the data collection system 100 is able to send messages to the various communicating meters 10*a*, 10*b*, 10*c*, 10*d*, 10*e*, 10*f*, 10*g*, 10*h* and 10*i* via, according to the communicating meter to which a message transmission relates, the base station to which it is connected. The data collection system 100 is furthermore configured to receive messages sent by the communicating meters in response to the messages that are sent to them, provided that they are able to respond. This is because some communicating meters may be temporarily disturbed by obstacles to electromagnetic waves or by poor operating conditions of the communication network, or according to potential standby cycles aimed at achieving energy savings.

Cleverly, the improved data collection method implemented by the system 100 for collecting data generated by the various communicating meters 10*a*, 10*b*, 10*c*, 10*d*, 10*e*, 10*f*, 10*g*, 10*h* and 10*i* performs four main steps S1, S2, S3 and S4, also here respectively called "labelling phase", "learning and planning phase", "scheduling phase" and "data collection phase".

During the step S1, and throughout a period T of a predefined duration (for example one complete week), the data collection system 100 sends protocol messages to the various communicating meters 10*a*, 10*b*, 10*c*, 10*d*, 10*e*, 10*f*, 10*g*, 10*h* and 10*i* and evaluates numerous items of information relating to the behaviours of the various meters. It is a case there of knowing whether or not a meter responds to a protocol message that is sent to it and, if so, in how much time. This information is recorded in combination with an identifier of the communicating meter concerned. During this step S1, information relating to the sale of the communication network 1000 via which a communicating meter has responded or has not responded is obtained and stored, so as to be able also to store all the information with reference to an identifier of a cell of the communication network 1000. The term "protocol message" designates here any message having a predefined format which a meter is supposed to be able to receive and interpret so as to respond thereto and which the data collection system 100 also comprises or at least which it is capable of generating and for which the data collection system 100 can identify a response or an absence of response. The format of the protocol messages exchanged is not described here since it does not participate in the understanding of the invention. The messages exchanged between the data collection system 100 and the communicating meters can be exchanged in the context of transmissions in relation to a provision of service or simply in the context of the search for information representing the operation of the communication meters, or via a combination of these two ways of proceeding. Thus, at the end of the period T of evaluating information representing the operation of the meters, the data collection system 100 has available information relating to each of the communicating meters, because of the numerous attempts at communications made via the message exchanges described.

According to one embodiment, the data collection system 100 evaluates and records at least items of information correlated with each other and in the form of:

- a cell identifier of the communication network 1000 with reference to a communicating-meter identifier,
- a state of obtaining a response from a meter to a message that is sent to it with reference to a timestamping, for example "response" or "absence of response" at the present time,
- a response time of a meter to a message that is sent to it, where applicable, with reference to a timestamping, for example a given meter has responded at such and such a time, after a delay of 10 seconds.

According to one embodiment, the data collection system 100 has available information relating to the meters for which a data collection is to be made and therefore the meters to which it is necessary to apply the improved data collection method. Thus the data collection system 100 has for example a list of identifiers of communicating meters concerned and has no need to implement any phase of discovering communicating meters present or potentially present in a geographical zone covered by the communication network 1000. For example, the data collection system 100 can send a message or several messages to each of the meters present in a list and next use information relating to the communication protocol of the cellular communication network 1000 to identify via which base station a meter has been able to be reached and in fact in which cell in the communication network it is located.

According to one example embodiment, the information evaluated and stored during the step S1 is grouped by cells in the communication network 1000, i.e. with reference to an identifier of a cell of the communication network 1000.

For example, a set of information obtained during the so-called labelling phase, during the step S1, can be organised as in the following table:

TABLE 1

| Cell identifier (Ceid) | Meter identifier (Coid) | Date (d) | Time (h) | State of obtaining of a response (r) | Response time (s) (tr) |
|---|---|---|---|---|---|
| A | 10a | 29 Sep. 2023 | 00:00 | response | 0.1 |
| A | 10b | 29 Sep. 2023 | 00:00 | response | 0.2 |
| A | 10c | 30 Sep. 2023 | 00:00 | no response | — |
| B | 10d | 30 Sep. 2023 | 00:00 | response | 0.1 |
| B | 10e | 01 Oct. 2023 | 00:15 | response | 0.2 |
| B | 10f | 01 Oct. 2023 | 00:30 | no response | — |
| C | 10g | 01 Oct. 2023 | 00:15 | response | 0.3 |
| C | 10h | 01 Oct. 2023 | 00:45 | response | 0.2 |
| C | 10i | 02 Oct. 2023 | 00:45 | no response | — |

Thus information on cell identifier, on meter identifier, on timestamping, on state of obtaining of a response and on response time is correlated together in a memory of the data collection system 100.

During the step S2, the data collection system 100 establishes operating parameters particular to each of the communicating meters involved in the collection or in other words the data collection system 100 establishes a behaviour profile for each of the communicating meters, from information evaluated during the step S1 during a period of duration T and stored. This learning phase is implemented by proceeding by meter and by timeslots, for example by meter and hour or by meter and quarter hour, or by meter and timeslots of five minutes, these examples not being limitative. According to a first embodiment, the data collection system 100 implements this learning phase by making a statistical analysis aimed at determining at what moment each of the communicating meters has the greatest probability of responding to a message that is sent to it, in particular to a data collection message. According to a second embodiment, the data collection system 100 implements this learning phase by implementing a learning of the "machine learning" type capable of providing a probability of success of communication for each of the meters involved in a future collection.

Each of these embodiments can be implemented according to variants the objectives of which are respectively:

- complying with an end-of-collection time constraint, such as for example aiming at having collected the data coming from all the meters before the next day at 8 a.m., or
- substantially reducing the use of the resources of the communication network used (here the communication network 1000) for the purpose of avoiding any redundancy in sending a message to the meter until the data to be collected are obtained.

According to one embodiment, when the analysis is of the statistical type and the objective is to comply with a time constraint, the data collection system 100 determines, for each of the meters, a timeslot for which this meter has the quickest connection time while having a minimum threshold of 50% response rate to messages that are sent to it.

According to one embodiment, when the analysis is of the statistical type and the objective is to reduce the use of the resources of the communication network used, the data collection system 100 determines a timeslot for which a meter has a maximum response rate to messages that are sent to it.

According to one embodiment, when the learning phase implements a learning of the "machine learning" type the objective of which is to determine a probability of success of communication according to the circumstances of the sending of a message to a communicating meter (for example depending on the day of the week, the date, the time, the character, holiday or not, of a day, etc), an algorithm of the "decision tree" type is used. According to one embodiment, the algorithm used is an algorithm for classifying (also called a classifier) each timeslot according to two classes respectively associated with a meter that is communicating and with a meter that is not communicating. Thus each timeslot will have a probability of belonging to a class for a given meter. According to one embodiment, it is considered that, if a timeslot has a probability of belonging greater than 0.6 for a class, then this timeslot belongs to this class. The objective of such an algorithm is to maximise the success rate in collecting data by complying with a collection deadline or minimising the number of communications necessary for a data collection available in a given communicating meter.

According to one embodiment, the training of the classifier, of the decision tree type, is based on two sets of information, one of which, the first, comprises all the first items of information previously collected at the step S1, timestamped (recorded in association with the current date and time), enhanced with second items of information that are the day of the week, the month of the year, the character, holiday or not, of the day concerned, the urban or rural character of the position of the meter identified by the cell of the network via which it communicates, and the other one of which, the second, comprises the class of belonging of each item of information (for example a class 0 according to which the meter is communicating and a class 1 according to which the meter is not communicating).

Cleverly, the algorithm thus trained is used during the step S2, where applicable (a variant of a learning mode of the "machine learning" type) to determine which is the best timeslot for each of the communicating meters involved in a planned future collection.

At the end of a learning thus implemented at the step S2, the data collection system 100 has the ability to determine, at the step S3, a collection scheduling according to predefined constraints, for example according to timetable constraints of a data collection (which day, which duration, etc).

According to one embodiment, the collection scheduling is implemented by proceeding cell by cell and for the purpose of subsequently implementing a collection in parallel (simultaneously) in each of the relevant cells of the communication network According to one embodiment, and according to collection organisation constraints, such as for example timetable constraints (for example in the night of Tuesday to Wednesday, between 9 p.m. and 9 a.m., in an urban zone), the scheduling is established so as to collect the data from all the meters that are identified as being able to respond at the planned moment of the collection and furthermore not being able to respond in the moments that follow the collection. The collection then relates to the maximum number of meters in each of the cells meeting this criterion while using the maximum resources of the communication network that are granted (or dedicated) to the collection during the collection period.

According to one embodiment, data collection tables are generated so as to establish a collection order (a sequence) with reference to each of the cells A, B and C, of the communication network 1000.

When a collection scheduling has been established by the data collection system 100 by evaluating information on the observed behaviour of meters to which the collection that is the object of the scheduling relates, then, by determining operating parameters (profile) for each of the meters, and taking account of an objective defined in terms of timetable constraints and/or level of network resources used, the data collection system 100 can implement the data collection during the step S4, proceeding in accordance with the scheduling established and by operating in parallel (simultaneously) in the various cells A, B and C of the communication network.

According to one embodiment and when the collection has ended at the end of the step S4, i.e. when the time allowed for collecting the data has elapsed, an optional step S5 is performed by the data collection system 100, aimed at determining the proportion of communicating meters that were able to be read successfully, i.e. the proportion of communicating meters that were able to send the data to be collected in response to a collection message coming from the data collection system 100.

If the collection rate determined at the step S5 is higher than a predefined collection objective (step S5, output "yes"), then the method is completed and no new collection operation will be performed before a new collection phase is planned in accordance with the collection policy defined. On the other hand, if the collection rate determined at the step S5 is insufficient (step S5, output "no"), then the method loops back to the step S1 while modifying for example the parameter T of duration of the labelling phase aimed at obtaining new information representing the behaviour of the communicating meters present in the communication network 1000. Each new iteration of the step S1 takes place when the degree of completeness of the collection is judged insufficient and is considered to be a phase of reinforcement of the learning that aims in particular to identify the communicating meters that are involved in the fact that it has not been possible to achieve the targeted collection rate. According to one embodiment, a new iteration of the step S1 is implemented with a duration of collection of information representing the behaviour of the meters greater than that defined initially (for example greater than seven days).

According to one embodiment, and considering that some meters may be identified as little inclined to respond, for example because of disturbances in the communications by electromagnetic transmissions, a communication strategy with these meters may advantageously be established, for example by not systematically reiterating an attempt at communication for all the elementary time periods considered by the data collection system 100 but attempting to collect data only from a predefined number of communicating meters to be read during an elementary time period. In other words, if the system reiterates attempts at communication with "difficult to join" meters every five minutes, it will attempt to reach only 70 or 60% of the meters remaining to be joined, for example, by periods of five minutes, to avoid congestion of the communication network 1000. Obviously the proportion of meters that are the subject of a new attempt may be any, between 0 and 100% depending on the results previously obtained.

According to one embodiment, and when a new communicating meter is inserted in the communication network 1000, the data collection system 100 makes provision for implementing a plan for collecting data identical to the one provided for a communicating meter geographically close to a communicating meter already known to the collection system 100, in terms of behaviour. If such a strategy does not make it possible to collect data from this meter without difficulty, then a learning phase will have to take place in accordance with the method described.

It should be noted that on FIG. 3 the optional character of step S5 is illustrated by broken lines.

Figure 4:
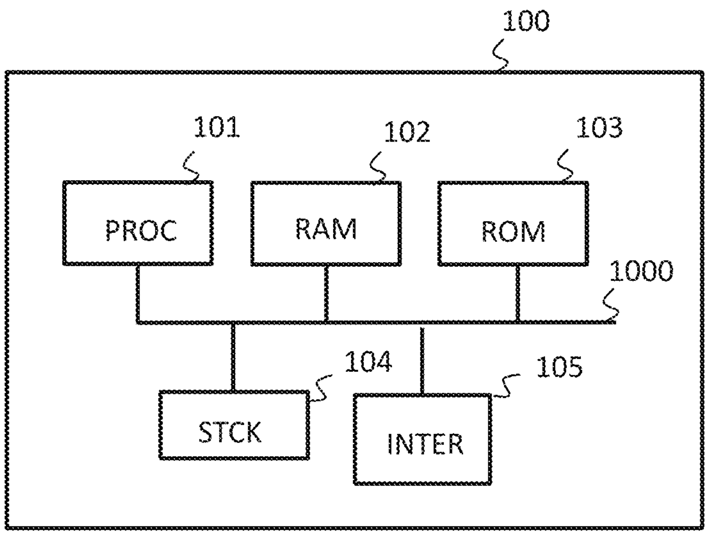
FIG. 4 is a diagram illustrating an internal architecture of a system or device for collecting data generated by communicating meters, according to one embodiment.

FIG. 4 illustrates schematically an example of internal architecture of the data collection system 100, also here called a data collection device or management server of a service provider. According to the example of hardware architecture shown in FIG. 4, the collection system 100 then comprises, connected by a communication bus 120: a processor or CPU ("central processing unit") 121; a random access memory (RAM) 122; a read only memory (ROM) 123; a storage unit such as a hard disk (or a storage medium reader, such as an SD (Secure Digital) card reader 124); at least one communication interface 125 enabling the data collection system 100 to communicate with devices present in the communication network comprising the data collection system 100, including in particular the communicating meters 10*a*, 10*b*, 10*c*, 10*d*, 10*e*, 10*f* and 10*h*, via the base stations STA-A, STA-B and STA-C.

The processor 121 is capable of executing instructions loaded in the RAM 122 from the ROM 123, from an external memory (not shown), from a storage medium (such as an SD card), or from a communication network. When the data collection system 100 is powered up, the processor 121 is capable of reading instructions from the RAM 122 and executing them. These instructions form a computer program causing the implementation, by the processor 121, of the method described in relation to FIG. 3 or one of the variants thereof.

All or part of the method implemented by the data collection system 100 or the variants thereof described can be implemented in software form by executing a set of instructions by a programmable machine, for example a DSP ("digital signal processor"), or a microcontroller, or be implemented in hardware form by a machine or a dedicated component, for example an FPGA (field-programmable gate array) or an ASIC (application-specific integrated circuit). In general, the data collection system 100 comprises electronic circuitry configured to implement the method described in relation to it as well as with devices connected to the communication network 1000. Obviously, the data collection system 100 further comprises all the elements usually present in a system comprising a control unit and its peripherals, such as a power supply circuit, a power-supply monitoring circuit, one or more clock circuits, a reset circuit, input/output ports, interrupt inputs and bus drivers, this list being non-exhaustive.

The invention is not limited solely to the embodiments and examples described but more broadly relates to any collection method, operating via a communication network of the cellular type, adapted to collect data available in a set of communicating meters and implemented in a data collection device connected to this network, and comprising: obtaining first information representing the behaviour of the meters, then establishing parameters (or profiles) representing the behaviour of each of the communicating meters from this information, with a view to establishing a scheduling of data collection from all or some of the meters from the parameters (or profiles) representing the behaviour of each of the meters, and next transmitting data collection messages to the communicating meters in accordance with the scheduling that was established. In particular, a classifier of a type other than a decision tree can be used for the learning phase implemented during the step S2.

The invention claimed is:

1. A method for collecting, via a communication network of a cellular type, data available in communicating meters, the method being implemented in a data collection system connected to said communication network, and the method comprising:

i) obtaining first information representing a communication performance behaviour of said communicating meters, said first information comprising at least a response time and a response rate for each meter with reference to a timestamping and a cell identifier, ii) establishing a communication performance behaviour profile for each of the communicating meters from said first information by a learning process based on observed communication data, wherein the learning process comprises at least one of a statistical analysis or a machine learning technique;

iii) establishing a scheduling of collection of data from all or some of said communicating meters, from said communication performance behaviour profile wherein said scheduling is established to optimize data collection based on the learned communication performance behaviour of the meters, and iv) transmitting data collection messages to said all or some of said communicating meters in accordance with said scheduling established.

2. The data collection method according to claim 1, wherein said first information comprises at least:

an identifier of a cell of said communication network with reference to a communicating meter identifier, a state of obtaining a response from a communicating meter to a message that is sent to it with reference to a timestamping, a response time of a communicating meter to a message that is sent to it, with reference to a timestamping.

3. The data collection method according to claim 2, wherein establishing a data-collection scheduling from said parameters is implemented with reference, for each of the communicating meters, to an identifier of a cell from which a communicating meter is accessible.

4. The data collection method according to claim 1, wherein establishing said parameters representing a behaviour of each of the communicating meters comprises a statistical analysis.

5. The data collection method according to claim 4, wherein the statistical analysis is implemented with reference to a maximum collection time.

6. The data collection method according to claim 4, wherein the statistical analysis is implemented with reference to a minimum use of said communication network.

7. The data collection method according to claim 1, wherein establishing said parameters representing a behaviour of each of the communicating meters comprises a learning by means of a module of a classifier type.

8. The data collection method according to claim 7, wherein the learning by means of a module of said classifier type is implemented with reference to a maximum collection time.

9. The data collection method according to claim 7, wherein the learning by means of a module of said classifier type is implemented with reference to a minimum use of said communication network.

10. A system for collecting, via a communication network of a cellular type, data available in communicating meters, the collection system comprising electronic circuitry configured for:

i) obtaining first information representing a communication performance behaviour of said communicating meters, said first information comprising at least a response time and a response rate for each meter with reference to a timestamping and a cell identifier, ii) establishing a communication performance behaviour profile for each of the communicating meters from said first information by a learning process based on observed communication data, wherein the learning process comprises at least one of a statistical analysis or a machine learning technique, iii) establishing a scheduling of collection of data from all or some of said communicating meters, from said communication performance behaviour profile wherein said scheduling is established to optimize data collection based on the learned communication performance behaviour of the meters, and iv) transmitting data collection messages to said all or some of said communicating meters in accordance with said scheduling established.

11. The data collection system according to claim 10, furthermore comprising circuitry configured to process said first information comprising:

an identifier of a cell of said communication network with reference to a communicating meter identifier, a state of obtaining a response from all or some of said communicating meters to a message that is sent to it with reference to a timestamping, a response time of a meter to a message that is sent to it, with reference to a timestamping.

12. The data collection system according to claim 10, comprising electronic circuitry configured to establish a data collection scheduling from said parameters established with reference, for each of the communicating meters, to a cell identifier from which a communicating meter is accessible.

13. The data collection system according to claim 10, furthermore comprising electronic circuitry configured to establish said parameters representing a behaviour of each of all or some of said communicating meters by making a statistical analysis.

14. The data collection system according to claim 13, furthermore comprising electronic circuitry configured to make the statistical analysis with reference to a maximum collection time.

15. The data collection system according to claim 13, furthermore comprising electronic circuitry configured to make the statistical analysis with reference to a minimum use of said communication network.

16. The data collection system according to claim 10, furthermore comprising electronic circuitry configured to establish said parameters representing a behaviour of each of the communicating meters by learning by means of a module of a classifier type.

17. The data collection system according to claim 16, furthermore comprising electronic circuitry configured to implement said learning by means of a module of said classifier type, with reference to a maximum collection time.

18. The data collection system according to claim 16, furthermore comprising electronic circuitry configured to implement said learning by means of a module of said classifier type, with reference to a minimum use of the communication network.

19. A non-transitory information storage medium comprising a computer program comprising a computer program code instructions that, when executed by a processor, performs the method according to claim 1.

* * * * *